Figure 1:
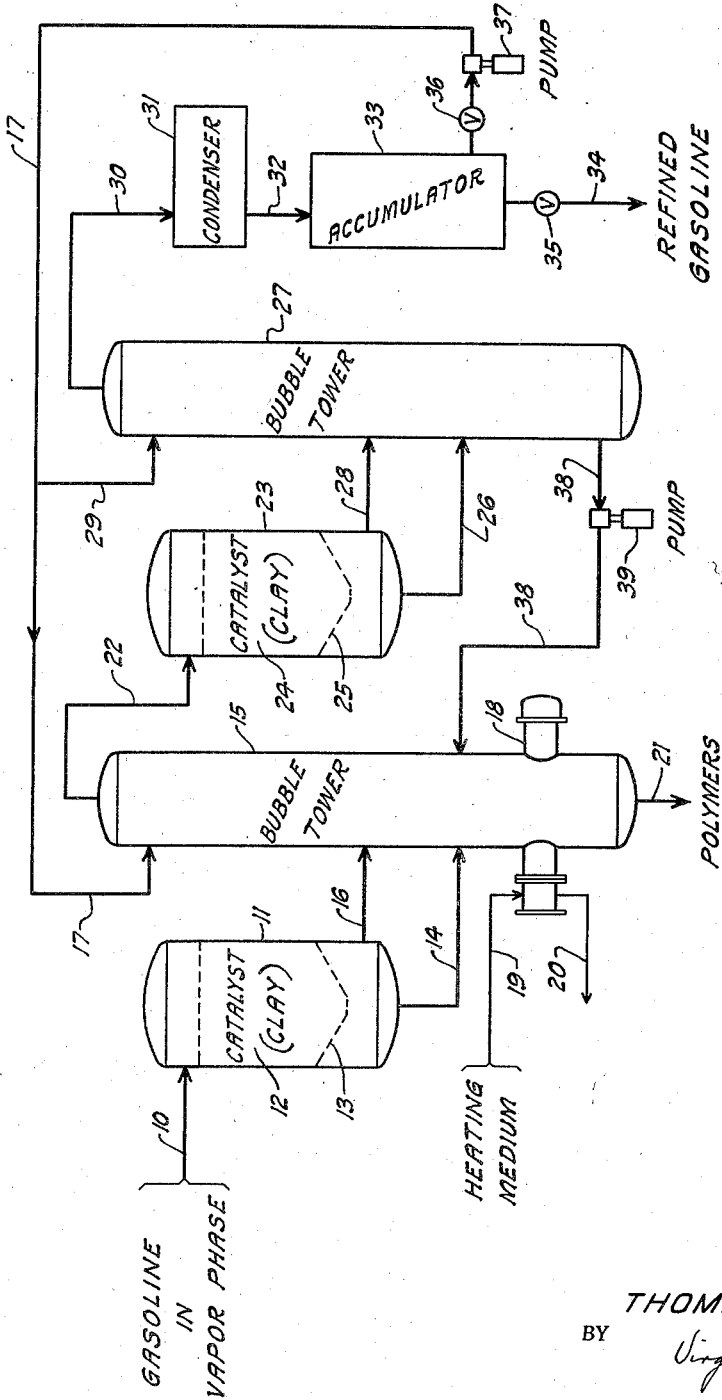

June 18, 1940.　　　　T. B. LEECH　　　　2,204,685

VAPOR-PHASE TREATMENT OF PETROLEUM

Filed June 10, 1938

INVENTOR.
THOMAS B. LEECH
BY Virgil E. Woodcock
ATTORNEY.

Patented June 18, 1940

2,204,685

UNITED STATES PATENT OFFICE 2,204,685

VAPOR-PHASE TREATMENT OF PETROLEUM

Thomas B. Leech, Narberth, Pa., assignor to Alcorn Combustion Company, Philadelphia, Pa., a corporation of Delaware Application June 10, 1938, Serial No. 213,085

2 Claims. (Cl. 196—96)

My invention relates to the vapor-phase treatment of petroleum, more particularly to the removal of unsaturated bodies from gasoline as polymers, and has for an object the withdrawal of the polymers from the system substantially entirely free of gasoline.

In the production of gasoline (either straight run or cracked) suitable for motor fuel, it is frequently desirable to pass the gasoline in vapor phase through treating towers charged with a suitable catalyst, such as fuller's earth. The catalyst produces a selective polymerization of the unstable, unsaturated compounds which may then be separated from the gasoline vapor. Heretofore, the products of the polymerizing reaction, the polymers, were withdrawn from the system, as from the bottom of each of a plurality of fractionating zones or stages, such as bubble towers. The polymers so withdrawn contained a substantial amount of gasoline, which was either lost or recovered; recovered as by returning the polymers to the vaporizer; or by passing them to an additional recovery system, in itself expensive as to first cost and as to operation.

In accordance with my invention in one form thereof, the polymers, separated from the gasoline vapors in the final fractionating zone, as in the bubble tower, are returned for fractionation to an intermediate fractionating zone or bubble tower equipped with a reboiler. In this manner the gasoline, entrained, condensed, or otherwise present in the polymers, is separated therefrom, and after passage out of the overhead outlet of the intermediate bubble tower, it is subsequently condensed.

Further in accord with my invention, any polymers as a result of the reboiling which pass overhead from the intermediate bubble tower pass through a catalytic tower and to a further fractionating or separating zone. In this manner, the resultant product is entirely free of polymers and the polymers entirely free of gasoline.

The term "gasoline," as used herein and in the claims, is defined to mean those products, hydrocarbons, within the boiling range, and having the characteristics, suitable for motor fuel.

For a more complete understanding of my invention, reference should now be had to the drawing, in which:

Fig. 1 diagrammatically illustrates a system embodying my invention; and

Figure 2:
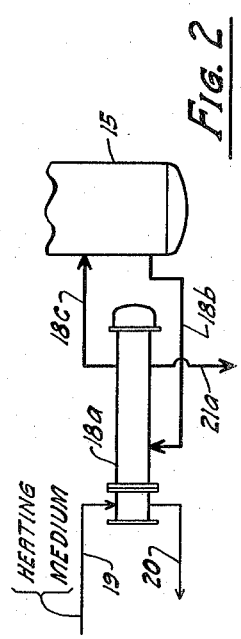

Fig. 2 is a fragmentary view illustrating a modification of the system of Fig. 1.

Referring to the drawing, gasoline in vapor phase, cracked or straight run, as produced from any of the several systems well known to those skilled in the art, passes through line 10 into the first treating stage or tower 11, charged with a suitable catalyst 12, such, for example, as fuller's earth. The fuller's earth, a clay catalyst which in size is preferably equivalent to that which will pass through a 30 to 60 mesh screen, is supported on a perforated plate and screen 13. As the vapors pass downwardly through the catalyst, the unstable, unsaturated hydrocarbons are polymerized. The heavier polymers are removed from the bottom of the treating tower 11, and through line 14 are introduced into an intermediate bubble tower 15. The vapors from the treating tower 11 pass through line 16 into the bubble tower. Refined gasoline is introduced into the bubble tower as reflux through the line 17.

In the tower 11 some of the gasoline is entrained in the polymers. A part of such entrained gasoline may be separated therefrom in the bubble tower 15, and such part that is not so separated, is recovered by provision of a reboiler 18 disposed in the bottom of the intermediate bubble tower 15. The reboiler 18 may be heated in manner well understood by those skilled in the art, as for example, by passing through it a heating medium such as a heat-carrier gas, or hydrocarbon vapors or oil at a suitably high temperature to boil the polymers which temperature, by way of example and not by way of limitation, may range from 500° F. to 800° F. The heating medium enters through line 19 and is removed from the reboiler 18 through line 20. The polymers, entirely free of entrained gasoline, are removed from the intermediate bubble tower and from the system through line 21.

In lieu of the reboiler 18, built in or forming a part of bubble tower 15, a separate unit, reboiler 18a, Fig. 2, may be provided, in which case the polymers and condensed and entrained gasoline from tower 15 pass by way of line 18b into reboiler 18a. The heating medium introduced by line 19 and removed through line 20 elevates the polymers to their boiling temperature, which may be between 500° F. and 800° F., more or less. In this manner, all gasoline present in the polymers is separated or stripped therefrom and by line 18c is returned to bubble tower 15. The gasoline-free polymers are removed from the system by way of draw-off line 21a.

The vapors introduced into the bubble tower 15 (and the gasoline separated from the polymers) pass upwardly therethrough, countercurrent to and in contact with, the reflux, the refined gasoline, which gravitates downwardly from plate to plate. As well understood by those skilled in the art, there occurs in the bubble tower 15 a progressive separation between the lower and higher boiling components. The polymers are removed through line 21, while the vaporous components are removed from the top of the bubble tower and through line 22 pass into a second treating stage or tower 23 containing a charge of fuller's earth, or other catalyst 24, supported upon a perforated plate and screen 25. Further polymerization of the undesirable components, unsaturated or unstable hydrocarbons, takes place as the vapors pass downwardly through the tower 23. The polymers, which ordinarily include entrained or condensed gasoline, are withdrawn through line 26 and are introduced into the final fractionating zone or bubble tower 27. The vapors from tower 23 are withdrawn through line 28 and pass into bubble tower 27. Reflux, as refined gasoline, is, through lines 17 and 29, introduced into the bubble tower 27. Due to the selective separation within the bubble tower 27, refined gasoline, still in vapor phase, is removed from the bubble tower through overhead line 30. By suitable heat exchange apparatus, as for example, a condenser 31, the gasoline is condensed and through line 32 introduced into an accumulator or storage tank 33. Refined gasoline for storage is withdrawn therefrom through line 34, controlled by valve 35. Reflux is withdrawn from accumulator 33 under control of valve 36 and a reflux pump 37, both included in the line 17.

Though the bubble towers 15 and 27 effectively separate the polymers from the lighter products, I have found that there may be entrained or condensed in the polymers collected in the bubble towers 15 and 27, gasoline in percentage as high as 3% of the charge introduced into the system through line 10, though such proportion of gasoline may be even greater or less than 3%.

In accordance with my invention the polymers are withdrawn from the final separating or fractionating zone of the system, as from the bubble tower 27, by line 38, elevated in pressure by pump 39, and returned to an intermediate zone of the system, as for example, bubble tower 15. By boiling to provide stripping in the intermediate zone, the polymers from the final zone of the system, all gasoline suitable for motor fuel, entrained, condensed, or otherwise present in the polymers, is separated or stripped therefrom. The so separated gasoline then passes from the bubble tower 15 through its overhead line 22.

While I have shown two catalytic treating towers 11 and 23 and two fractionating stages 15 and 27, it is to be understood my invention is not limited thereto, as it comprehends the provision of any number of treating towers and bubble towers.

It is characteristic of my invention that the recovery of gasoline present in the polymers is accomplished without the addition of auxiliary heating apparatus, aside from the reboiler, and without the addition of other elements of a recovery system as heretofore proposed or utilized; and it is further characteristic of my invention that no additional load is placed upon the heating apparatus utilized to produce the gasoline in vapor phase, which is introduced into charge line 10.

By boiling the polymers in an intermediate stage, bubble tower 15, any polymers which may pass out through overhead line 22 with the gasoline in vapor phase are condensed in tower 23 or in the final separating zone, tower 27, to insure the final product, refined gasoline, shall be free of polymers.

While I have shown a particular embodiment of my invention, it will be understood that I do not limit myself thereto, since many modifications may be made, and I therefore contemplate by the appended claims to cover any such modifications as follow within the spirit and scope of my invention.

What I claim is:

1. In a vapor-phase process of polymerizing and removing undesirable constituents from gasoline by contacting the gasoline in vapor phase in a plurality of stages under substantially the same pressure with a polymer-producing catalyst, and in a separating zone following each of said stages separating the polymers from the gasoline, the steps which comprise returning the polymers and the gasoline contained therein from the bottom of the final separating zone to an intermediate separating zone, flowing the polymers and gasoline contained therein from the bottom of the preceding treating stage to said intermediate zone, applying heat to the lower portion of said intermediate separating zone simultaneously to boil all the polymers formed in the system, to vaporize and strip from them all of said gasoline, withdrawing from the bottom of said intermediate separating zone and from the system, gasoline-free polymers, passing said gasoline so separated through at least one of said treating stages, and thereafter through at least one of said separating zones to strip all polymers therefrom, and thereafter condensing and withdrawing from the system polymer-free gasoline.

2. In a vapor-phase gasoline refining system, the combination with a plurality of catalytic towers, each followed by a separating and fractionating tower for polymerizing in a plurality of stages undesirable products from gasoline in vapor phase, of means including a conduit for return of polymers from the bottom of the final separating tower to an intermediate separating fractionating tower, means including a conduit for flow of polymers from bottom of said first catalytic tower to said intermediate separating tower, means for applying heat to all of said polymers within the lower portion of said intermediate separating tower to boil them and thereby vaporize all gasoline present therein, means including a conduit connected to the bottom of said intermediate separating tower for withdrawing from said intermediate tower gasoline-free polymers, and means for condensing and withdrawing from the last separating tower of the system polymer-free gasoline.

THOMAS B. LEECH.